United States Patent [19]

Hulse

[11] 4,366,603
[45] Jan. 4, 1983

[54] FASTENER FOR RETAINING A PAIR OF PANELS

[75] Inventor: David O. Hulse, Exton, Pa.

[73] Assignee: The Budd Company, Troy, Mich.

[21] Appl. No.: 188,501

[22] Filed: Sep. 18, 1980

[51] Int. Cl.³ .............................................. A44B 17/00
[52] U.S. Cl. ................................ 24/221 R; 24/213 R; 411/500
[58] Field of Search ............ 24/221 R, 221 K, 213 R, 24/214, 305, 350, 351, 326; 411/500, 508, 509, 510

[56] References Cited

U.S. PATENT DOCUMENTS

| | | | |
|---|---|---|---|
| 3,810,279 | 5/1974 | Swick et al. | 411/509 |
| 3,956,803 | 5/1976 | Leitwer | 24/221 R |
| 4,266,591 | 5/1981 | F'Geppert | 411/500 |

FOREIGN PATENT DOCUMENTS

| | | | |
|---|---|---|---|
| 249111 | 8/1961 | Australia | 411/508 |
| 156197 | 10/1933 | France | 411/500 |
| 1098642 | 1/1968 | United Kingdom | 24/297 |

Primary Examiner—Robert A. Hafer
Attorney, Agent, or Firm—Edward M. Farrell; Thomas I. Davenport; Herman Foster

[57] ABSTRACT

A fastener for retaining two adjacent edges of a pair of panels against the surface of a structure includes a head with an eccentrically disposed stem extending therefrom. A flange section around the stem is spaced from the head. Projecting sections extend from the stem below the flange. The projecting sections extend through an opening in the surface of the structure and retains the fastener therein.

8 Claims, 8 Drawing Figures

U.S. Patent   Jan. 4, 1983   Sheet 1 of 2   4,366,603
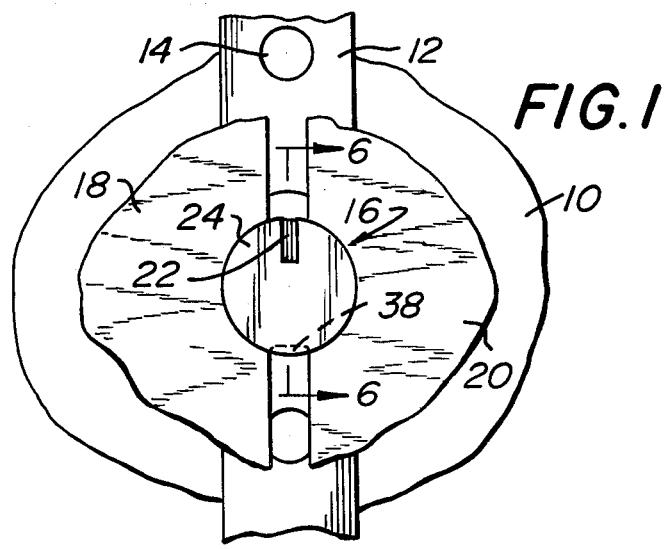
FIG.1
FIG.2
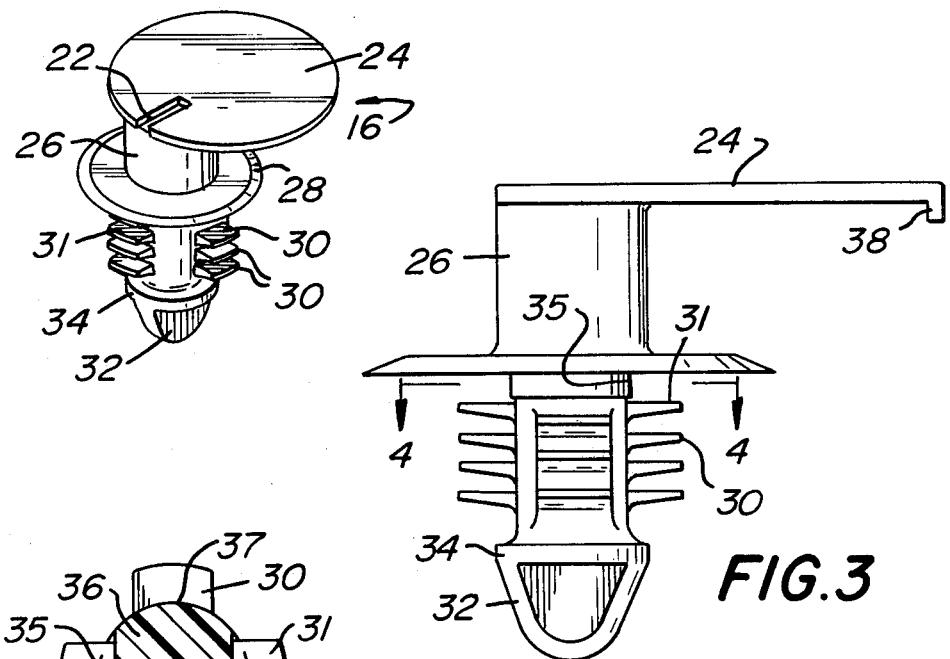
FIG.3
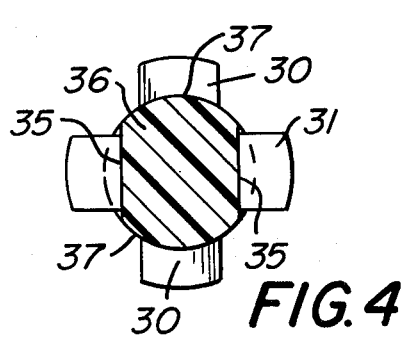
FIG.4

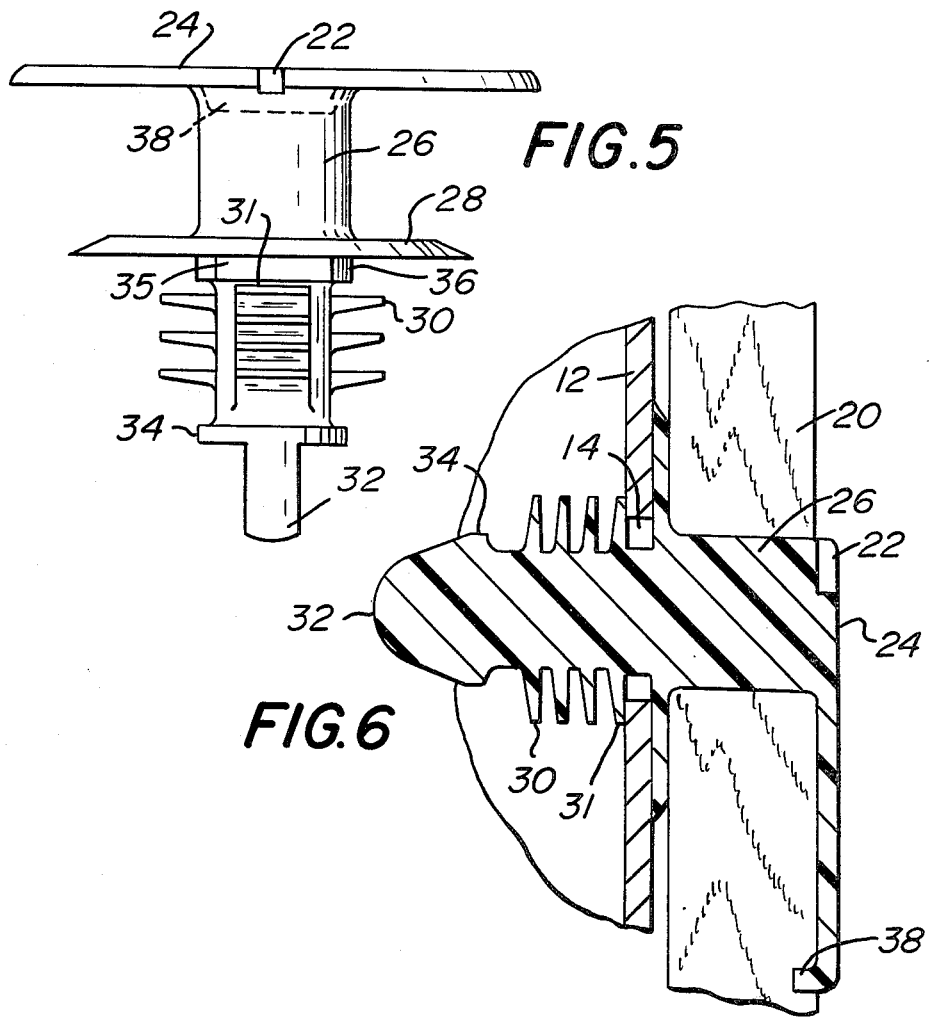
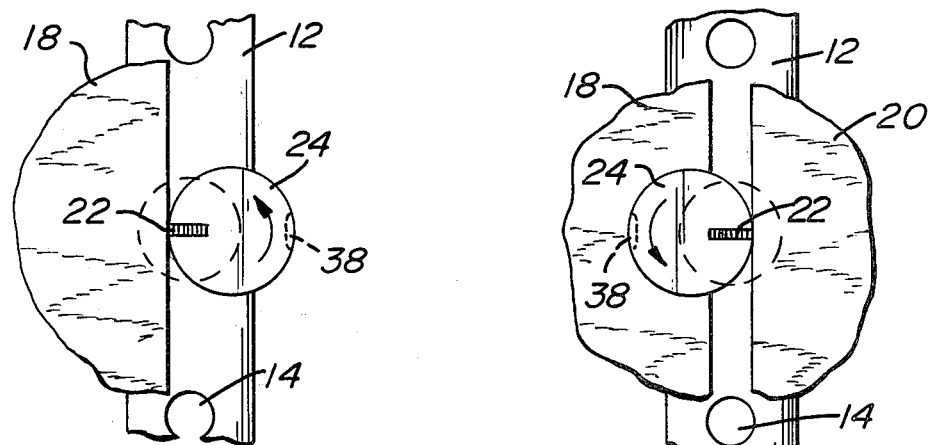

FASTENER FOR RETAINING A PAIR OF PANELS

BACKGROUND OF THE INVENTION

Installing panels in boxes of trailers and other places is often a time consuming operation. In the case of trailers, the panels are generally mounted to the structural members. These members may be posts or part of the skin making up the walls of the trailer box. Generally, the panels must be drilled to provide openings to permit rivets or other attachment means to be mounted through the openings in order to hold the panels in place.

Panels inside of trailer boxes are subjected to much physical abuse and damage due to heavy objects coming into contact therewith. As a result, it is often necessary to rearrange, remove or replace the panels. This is a time consuming process generally requiring special tools to remove and replace the rivets before the panels can be detached from the posts, skin or other structure of the trailer.

It is desirable to provide means for minimizing the time and labor required to remove panels. It is also desirable that an average workman be able to remove the panels with ordinary hand tools, such as a screw driver or pliers.

It is an object of this invention to provide an improved fastener for retaining two panels against a post or other structural member.

It is a further object of this invention to provide an improved fastener for retaining two panels against a post or other structure which may be readily installed without special tools.

It is still a further object of this invention to provide an improved fastener for retaining two panels against the surface of a structure which does not require any modification or drilling of the panels.

It is still a further object of this invention to provide an improved fastener for retaining two panels against a post or other structure wherein either panel may be removed or replaced without the need for special tools, drilling holes or using new fasteners.

BRIEF SUMMARY OF THE INVENTION

In accordance with the present invention, a fastener is adapted to fit through and be retained in an opening of a post or other structure to retain two adjacent edges of adjoining panels against the post or structure. The fastener includes a main head portion which is readily rotated by a tool such as a screw driver or pliers. A stem is disposed to extend from said head portion into the post opening. The head is disposed eccentrically and tangent to the stem so that the head retains both panels in one position and is rotatable in one direction or the other to permit one or the other panel to be removed from the post. A flange section is spaced from the head portion and extends around the stem to provide stability and prevent the fastener from tipping. The space between the head and the flange is disposed to receive adjacent edges of the pair of panels. Retaining sections extend from the stem disposed below the flange section and are disposed to pass through the opening in the post or structure to retain the fastener therein.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIG. 1 is a front view, partly broken away, of a fastener in place on a post retaining a pair of panels, in accordance with the present invention;

FIG. 2 is an isometric view illustrating one embodiment of a fastener, in accordance with the present invention;

FIG. 3 is a side view of the fastener illustrated in FIG. 2;

FIG. 4 is a cross-sectional view taken along lines 4—4 of FIG. 3;

FIG. 5 is another side view of the fastener illustrated in FIG. 2, rotated in counterclockwise direction ninety degrees with respect to the view of FIG. 3;

FIG. 6 is a cross-sectional view taken along lines 6—6 of FIG. 1;

FIG. 7 is a front view somewhat similar to the view of FIG. 1, with the fastener rotated in a clockwise direction ninety degrees, with one panel being disposed to be removed or installed; and FIG. 8 is a front view somewhat similar to the view of FIG. 1, with the fastener rotated ninety degrees in a counterclockwise direction with one panel in place and the other disposed to be installed or removed.

DETAILED DESCRIPTION OF THE PREFERRED EMBODIMENTS

In the description which follows, reference will be made to a post in the box of a trailer. It is understood, however, that the present invention may be used with the surface of any structure, particularly, structures associated with the skins or walls of the trailer box.

Referring particularly to FIG. 1, a typical installation in a box of a trailer is illustrated. The trailer includes an outer skin 10 attached to a plurality of spaced vertical posts, of which the post 12 is illustrated. The post 12 includes a plurality of apertures 14 therein. The apertures 14 are adapted to receive and hold a plurality of fasteners such as the fastener 16, which is constructed in accordance with the present invention. The fastener 16 may be molded and made of nylon or any other suitable material. The apertures 14 may be punched in the post 12 or in the trailer skin 10 during the same operation and with the same tooling that punches rivet holes in these components during the manufacturing of the trailer.

A pair of panels 18 and 20 are secured to the post 12 by means of the fastener 16. As will be described in detail, the fastener 16 is retained in the aperture 14 and remains there during the installation or removal of either or both of the panels 18 and 20. In one embodiment of the present invention, the fastener 16 includes a slot 22 adapted to receive a screw driver to permit the fastener 16 to be rotated 90° in one or the other direction.

Referring to FIG. 2, the fastener 16 includes a main round, thin, flat head portion 24 which is eccentrically located or off center with respect to a stem 26 which extends therefrom. The stem 16 is close to the tangent of the head portion 24 to permit the head portion to be rotated out of the way of one or another panel, as will be described. A flange section 28 is spaced from the head portion 24 and is concentric with the stem 26. The flange section or retaining shelf 28 below the head 24 provides stability for the fastener 16 and prevents it from tipping into the installation holes or apertures 14 during rotation of the fastener 16. If the fastener 16 is used at the end of a series of panels, it may be in contact with only one panel and therefore would tip away from the panel in the absence of the flange 28. The space between the head 24 and the flange 28 is designed to accommodate the thickness of the panels 18 and 20. The flexibility of the head makes it possible to accommodate adjacent panels of different thicknesses.

A plurality of cleat like extensions 30 extend from the lower portion of the stem 26 below the flange section 28. Instead of extending circumferentially completely around the stem 26, the cleat elements 30 or outwardly projecting sections are divided into rows with the elements on each row staggered with respect to the elements in the adjacent rows on opposite sides thereof. The rows of cleat elements are disposed at spaced distances of approximately 90°, as illustrated. The cleat like elements or projecting sections 30 are flexible and compress when the fastener 16 is installed through the opening 14. After passing through the opening 14, the elements 30 extend and engage the outer edge of the opening 14 to hold the fastener 16 in place, as illustrated in FIG. 6.

The opposite rows of flexible elements 30 and 31 have the same spacing underneath the flange section 28 and also between the elements themselves. This same spacing on opposite sides provides a flat plane gripping surface to assist the flange section 28 in providing stability. The flexible elements 30 and 31 have a somewhat triangular cross-section. This predisposes them to bend during installation in one direction only providing a tighter gripping action.

A somewhat tapered bottom section 32 provides a lead-in profile at the end of the stem 26. The tapered portion permits the fastener 16 to be easily installed in the opening 14. An untapered section 34 is wider than the stem 26 and is dimensioned to clear the opening 14 and align the fastener 16 as the fastener is being installed. As mentioned, the cleat like elements 30 are disposed in opposite rows and have substantially the same spacing therebetween. The cleat like elements 30 are designed to accommodate different thicknesses in the post 12 or other structure with which the fastener is used.

The stem 26 includes a section 36 disposed directly below the flange 28. As illustrated in FIG. 4, the section 36 includes indented flat portions 35 and rounded portions 37. The portions 37 provide support and stability for the fastener inside the hole and is close to the same diameter thereof, for example, one quarter of an inch. The indented portions 35 provide clearances to permit the top cleats or projecting sections 31 to bend upwardly as the fastener is inserted through the opening.

The free end of the head portion 24 includes a projecting section 38 extending downwardly from the outer edge. This projecting section 38 is disposed to index in the space between the panels 18 and 20 as illustrated in FIG. 1. The head section is flexible and will generally snap into place when the fastener is accurately positioned to hold the two adjacent panels. The section 38 also prevents the fastener from rotating in the presence of vibrations.

As illustrated in FIG. 1, when the fastener 16 has its head portion 24 in the position shown, the fastener 16 secured within the opening 14 maintains the panels 18 and 20 in the space between the main head portion 24 and the flange 28 and against the post 12.

Referring to FIG. 7, the main head portion 24 is illustrated rotated ninety degrees in a clockwise direction. In this position, the head 24 is free of the panel 18. In this position, the panel 18 may be installed or removed away from the post 12. The head 24 may be rotated by means of a screwdriver inserted into a slot 22, or by changing the configuration of the head 24 slightly, a pair of pliers may be used to accomplish the rotation.

Referring to FIG. 8, the fastener 16 is illustrated with its head 24 rotated ninety degrees in a counter-clockwise direction so that the head 24 now clears the panel 20 while retaining the panel 18 in place against the post 12. The position illustrated could represent either the installation or removal of the panel 20.

The installation of the fastener 16 is relatively easy and may be pressed into the apertures 14 manually in much the same manner as a thumbtack is installed onto a surface. Once the fasteners 16 are installed, they need never be removed from the post 12. A relatively easy rotation of the fastener permits the panels 18 and 20 to be installed or removed.

As illustrated, no holes or drilling in the panels 18 and 20 are required. The stem thickness assures uniform gapping between the panels 18 and 20. These conditions tend to reduce the bulging of the panels in wet weather.

The fastener 16 may be made of any suitable material, preferably nylon or plastic which is flexible in nature. While a preferred embodiment has been illustrated, it is apparent that variations in the details of the fastener illustrated may be made without departing from the present invention. The cleat members 30 and 31 may take various forms and may be different in number to those illustrated. For example, expandable or contractable legs may be used in place of the cleats to hold the fastener in place once it is installed.

While FIG. 6 illustrates a relatively thin structure 12 and the elements 30 relatively straight, it is apparent that when the fastener is attached to thicker structures, several of the flexible elements 30 would be bent or folded inside the aperture 14.

What is claimed is:

1. A fastener for retaining two adjacent edges of a pair of panels to a structure having an opening therein comprising:
   (a) a round head portion;
   (b) a stem extending from said head portion eccentrically disposed with respect thereto;
   (c) a flange section extending around and outwardly away from said stem to provide stability for said fastener when it is inserted into said opening and further being spaced from said head portion to receive said panels therebetween;
   (d) retaining sections extending from said stem disposed below said flange section to retain said fastener in the opening of said structure after it has been inserted therein;
   (e) a portion of said stem extending below said flange section being disposed to pass through said opening in said structure with said flange section providing a stop means to maintain said fastener stable inside of said opening and permitting said fastener to be rotated when inserted inside of said opening; and
   (f) said eccentrically disposed stem being disposed close to the tangent of said head portion to permit said head portion to be rotated to positions free of one or the other of said panels or rotated to a position to hold in place on said structure both of said pair of panels.

2. A fastener as set forth in claim 1 wherein said head portion includes a slot for receiving a tool therein to permit said fastener to be turned after it has been inserted in said opening.

3. A fastener as set forth in claim 2 wherein said head portion includes a downwardly projecting section disposed to fit into a space between said panels when the fastener is accurately positioned to hold both of said panels.

4. A fastener as set forth in claim 3 wherein said retaining sections comprise a plurality of spaced rows of flexible elements, with each row including a plurality of spaced elements staggered with respect to the elements in the next adjacent rows.

5. A fastener as set forth in claim 4 wherein said slot is aligned with said stem extending from said head portion.

6. A fastener as set forth in claim 5 wherein a tapered bottom section is provided at the end of said stem to provide lead in means for said fastener when it is inserted into said opening.

7. A fastener as set forth in claim 6 wherein the portion of the stem extending below said flange section includes partly rounded portions with flat indented portions therebetween, the rounded portions providing stability for the fastener inside of said opening and the indented portions providing clearances to permit upward movement of top elements in said rows of flexible elements when the fastener is being inserted through said opening.

8. A fastener as set forth in claim 7 wherein said fastener comprises a molded, single piece, flexible element.

* * * * *